United States Patent [19]
Rieder et al.

[11] Patent Number: 5,007,177
[45] Date of Patent: Apr. 16, 1991

[54] INCREMENTAL MEASURING SYSTEM

[75] Inventors: Heinz Rieder, Oberndorf; Max Schwaiger, Ostermiething, both of Austria

[73] Assignee: RSF-Elektronik Gesellschaft m.b.H., Tarsdorf, Austria

[21] Appl. No.: 467,945

[22] Filed: Jan. 22, 1990

[30] Foreign Application Priority Data

Feb. 3, 1989 [AT] Austria ................................ 219/89

[51] Int. Cl.[5] ........................ G01B 7/02; G01B 11/02
[52] U.S. Cl. ................................... 33/706; 33/707; 33/708; 33/1 L; 250/237 G
[58] Field of Search ............... 33/706, 707, 708, 1 L, 33/DIG. 3; 356/375, 374; 250/237 G

[56] References Cited

U.S. PATENT DOCUMENTS

| 4,229,646 | 10/1980 | Burkhardt et al. | 250/237 G |
| 4,459,750 | 7/1984 | Affa | 33/707 |
| 4,519,140 | 5/1985 | Schmitt | 33/706 |

FOREIGN PATENT DOCUMENTS

| 0172323 | 2/1986 | European Pat. Off. |
| 0239768 | 10/1987 | European Pat. Off. |
| 1814785 | 6/1970 | Fed. Rep. of Germany |
| 2540412 | 3/1977 | Fed. Rep. of Germany |
| 3445694 | 6/1985 | Fed. Rep. of Germany |
| 58394 | 10/1967 | German Democratic Rep. |

Primary Examiner—William A. Cuchlinski, Jr.
Assistant Examiner—Alvin Wirthlin
Attorney, Agent, or Firm—Kurt Kelman

[57] ABSTRACT

The incremental measuring system comprises a scale member with an incremental scale and a scanning unit comprising scanning sets for generating analog measured-value signals in response to the scanning of the scale. The system also comprises an evaluating unit for deriving digital countable signals from the analog measured-value signals and for generating a reference pulse. At least one pair of reference marks are spaced along the scale on a carrier releasably fixed to the scale member. The scanning unit comprises a reference mark scanning set to scan the reference marks and connected to the evaluating unit. A reference point which registers with a selected increment of the scale is disposed on the carrier between the reference marks of the pair and can be defined by the distances from the reference point to the reference marks, and these distances are stored in a memory. When the reference mark scanning set has scanned one reference mark and has then moved toward the reference point by a distance equal to that of the stored distances, a pulse shaper stage in the evaluating unit will generate a reference pulse when this scanning set scans the reference point.

5 Claims, 1 Drawing Sheet

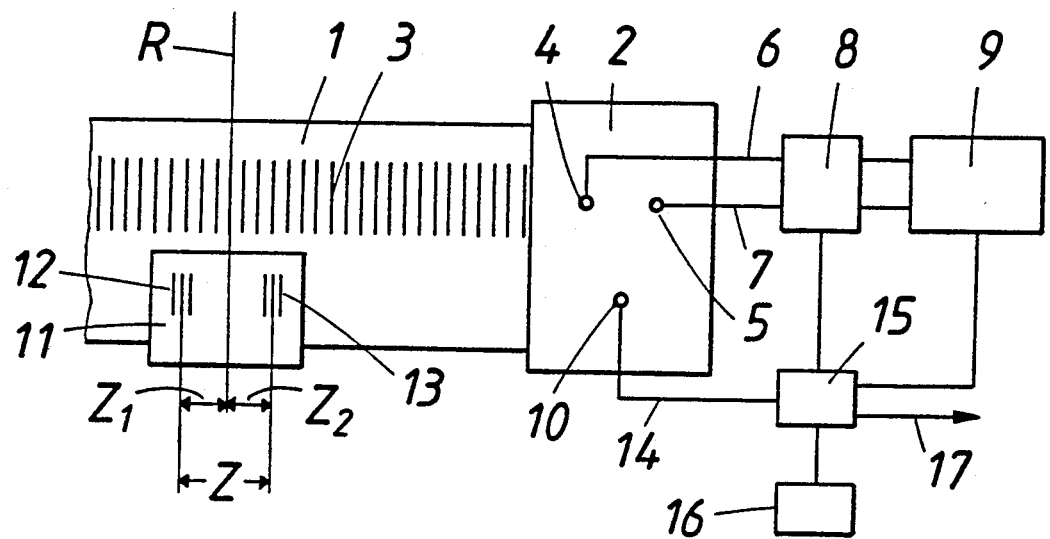

INCREMENTAL MEASURING SYSTEM

BACKGROUND OF THE INVENTION

1. Field of the Invention

This invention relates to an incremental measuring system, particularly to a system for measuring lengths, comprising a scale member, which is provided with a scale, which is adapted to be scanned in a non-contacting manner, a scanning unit including scanning sets for scanning said scale and for generating analog measured-value signals in response to the scanning of the scale, and an evaluating unit for deriving countable signals from said measured value signal. Said scale member is provided in association with said scale with reference marks and the scanning unit comprises an additional scanning set for scanning said reference marks. An evaluating circuit is provided, which in response to the signals generated in response to the scanning of the reference marks generates reference pulses, each of which is associated with a location which is spaced a predetermined distance from one of the reference marks.

2. Description of the Prior Art

DE-A-34 45 694 discloses an incremental measuring system in which the scale can be optoelectronically scanned in a non-contacting manner by the scanning unit. Other known measuring systems are provided with scales which can be scanned by inductive, magnetic or capacitive methods. The measured-value signals generated in response to the scanning of the scale are periodic, e.g., sinusoidal analog signals, in which a complete signal period is associated with a complete scale increment, which in case of an optoelectronic scanning may consist of a bright field and a dark field of the scale. At least two measured-value signals are generated, which are displaced 90° in phase and one of which leads the other in dependence on the direction of movement of the scanning unit so that that sequence can be used to determine the direction of the scanning movement. In the processing of the analog measured-value signals to generate digital countable signals the scale increments may be subdivided electronically or arithmetically, e.g., by means of microcomputers. The digital countable signals may be used as control signals for a machine or robot and for a display of the results of measurement by display units. In order to establish a definite relationship between each countable signal and the currently scanned location of the scale the counting means must be set to certain values, such as zero, when the scale is scanned at predetermined or preselectable locations. For that purpose, reference marks may be provided for permitting a generation of reference pulses in various length portions of the scale member in definite association with the scale. In that case a reference point which is being approached must be identified so that the control can be related to the associated location of the scale. It is known to provide expensive control and switching systems for a distinction between selected and unselected reference points. For exact measurements the reference points are defined by reference marks, which are provided on the scale member jointly with the scale but in a separate track. In applying said reference marks, care must be taken to ensure an exact register of the reference marks with increments of the scale. The scanning of such reference marks through an associated grating of a separate scanning unit will directly result in a generation of reference pulses, which are required to occur in proper edge coincidence and phase coincidence with the measured-value signal and countable signals. It is possible to provide a plurality of reference marks on the scale member and to select one or some of said reference marks for the actual control. That selection may be effected in that unselected reference marks are covered or removed. Such covering or removal of reference marks will be expensive if the measuring system is encapsulated, as is usually the case, and may be performed only by skilled labor and reference marks which have been removed cannot be renewed. Known selecting systems include mechanical on-off switches, which are known from DE-A-18 14 785 and are actuated by separate stops during the scanning movement of the scanning unit and which activate the evaluating circuitry only in response to the scanning of selected reference marks. In a design disclosed in DE-B-25 40 412 those mechanical switches have been replaced by magnets, which are adapted to be attached to the scale member at predetermined locations and serve to actuate selecting switches, which consist of reed relays provided in the scanning unit. It is also known to provide the reference marks in a plurality of reference tracks, to provide a scanning unit for each track, and to select a reference mark in that the scanning unit of the track in which that reference mark is contained is selectively enabled to generate reference mark signals. That concept requires an expensive design of the scale member and of the scanning units and requires difficult adjusting operations to be performed when the measuring system is to be activated. In preferred designs, the reference marks which may be selected are provided in a single track. In accordance with EP-A-0 239 768 an indentification of a selected reference mark is permitted in that the reference marks are evenly spaced apart and that reference mark which is adjacent to a selected reference mark is removed. Two scanning units are used, which comprise scanning sets, which are spaced like the reference marks and arranged in an antiparallel connection so that signals generated by existing reference marks will offset each other. When the selected reference mark is being scanned, the signal which would otherwise be generated by the adjacent reference mark is not generated because that adjacent reference mark has been removed. In response to the scanning of a selected reference mark, a reference signal which can be evaluated will be generated because in such arrangements it will be virtually impossible to effect a subsequent change of the selection of reference marks.

It is known from EP-A-0 172 323 to apply pairs of reference marks with a periodically changing spacing so that a length code is obtained, from which that half of a reference mark can be defined from which a reference pulse that is to be evaluated can be derived.

It is known from DD-A-58 394 to provide a scale member with code marks which can be displaced along the scale member and can be fixed in position and which can be scanned for a generation of control commands. It is not possible to position a code mark so accurately relative to the scale that the control signals which are generated are in phase and edge coincidence, like the reference pulses derived from stationary reference marks, with an analog measured-value signal generated in response to the scanning of the scale and with a digital countable signal which has been derived from that analog signal. That inaccuracy may result in measurement errors and/or control errors also in dependence on the directions in which a given reference mark is approached.

SUMMARY OF THE INVENTION

It is an object of the invention to provide a measuring system which is of the kind described first hereinbefore and which one or more reference points can be defined with a high reliability and circuitry, and corresponding reference pulses can be generated in phase and edge coincidence with the measured-value signal and countable signal and the location of the reference point or points can be changed in case of need without a high expenditure, and this can be achieved in a system and with circuitry which involve only a low expenditure.

In a system which is of the kind described first hereinbefore the object set forth is accomplished in accordance with the invention in that at least one pair of longitudinally spaced apart reference marks are provided on at least one carrier, which is releasably secured to the scale member in a selected position, a reference point disposed between the reference marks of one of said pairs is adapted to be defined in register with a selected increment of the scale and the distances by which said reference point is spaced from the two reference marks of said pair are stored in a memory, and the evaluating unit comprises a separate pulse shaper stage for generating a reference pulse when the scanning unit moving in a given direction has moved past one of the two reference marks of a pair thereof and after the movement past said one reference mark of a pair thereof has moved over a distance which is defined by the associated stored value and is determined by the scanning of the scale.

In such a system the scale member is simplified because only the scale need be provided thereon. The reference marks may be similar or equal to the known reference marks or they may have a simpler form because it is sufficient to generate an enabling signal for the further evaluation in response to the scanning of a reference mark provided at an exactly defined location. The reference point proper is defined by the distances by which it is spaced from the reference mark and is identified by a countable signal so that the reference pulse can be generated in proper phase and edge coincidence with the scale increment which registers with the reference point, with the measured-value signal which is derived from that scale increment, and with the corresponding countable signal. Even if the carrier has been secured to the scale member in such a position that the reference marks do not exactly register with scale increments, it will be possible exactly to define the distances by which the reference point is spaced from the reference marks. Because a separate pulse shaper stage is provided for generating the reference pulse, the waveform or timing of that pulse can be adapted to the requirements of the measuring or control means to which said pulse is delivered and that waveform and timing will be entirely independent from the waveform of the reference mark signals which are generated by the reference mark scanning set in response to the scanning of the reference marks. The pulse shaper stage may be provided with a memory, which will determine the pulse shape of the reference pulse. The location of a reference point relative to the scale can be changed in that the carrier is adjusted along the scale. The carrier may be adhesively bonded or screwed to the scale member or may be held in position thereon by a separate support. Alternatively, the carrier may consist of a clip, which embraces an edge portion of the scale member and which has been inserted through a slot, which is formed in a tubular enclosure, which contains the scale member and the scanning unit, which slot is sealed by sealing lips. In that case the carrier can be inserted through said slot into the enclosure and can be adjusted in case of need by means of suitable implements. For the first mounting of the carrier a resilient clip which will hold itself on the scale member can first be coupled to a swordlike actuator for the scanning unit and displaced in unison with that actuator and can be uncoupled from that actuator when the clip has reached that portion of the scale member on which the reference point is to be provided.

The carrier may be provided with identical reference marks for generating identical reference mark signals regardless of whether the marks are scanned from right to left or from left to right. When the measuring system is put into operation for the first time and the scanning unit is disposed over the carrier it must be prevented that a wrong reference pulse is generated at a point which is spaced by the stored distance on the left of the left-hand reference mark or on the right of the right-hand reference mark (rather than at a point disposed between the reference marks). For that purpose, suitable protective measures are adopted. In the simplest case the reference mark signal which is generated by the reference mark scanning set when that set is scanning the carrier between the reference marks may differ from the signal which is generated by that scanning set outside the range which is defined by the two reference marks. Alternatively, measures can be adopted which ensure that a reference pulse cannot be utilized unless a reference mark has been scanned and the scanning unit has been reversed after it has moved from that scanned reference mark over the stored distance to the reference point. Finally, the scale member or the outside surface of the enclosure may be provided with marks which indicate the region in which the carrier has been attached and when the operation of the system is initiated the scanning unit may be moved to a position which is outside that attachment region. Alternatively, reference marks may be provided which can be scanned to have different signal-generating characteristics and in that case the generation of the reference pulse can be inhibited until the scanning set for the reference marks has scanned one reference mark and from that reference mark has moved toward the other over the stored distance. That feature may be adopted because the reference marks need not be designed for a generation of identical signals.

A selection between reference points which are disposed between respective pairs of reference marks provided on respective carriers will be permitted if the pairs of reference marks provided on said carriers have different signal-generating characteristics so that the reference mark scanning set will generate different signals in response to the scanning of said pairs of reference marks.

BRIEF DISCRIPTION OF THE DRAWING

The drawing is a diagrammatic fragmentary elevation showing a portion of a scale member, which is provided with a scale that can be scanned by an optoelectronic method, a reference mark carrier, which is mounted on said scale member, and a scanning unit associated with that scale member, and a block circuit diagram showing the essential components of the evaluating unit.

DETAILED DESCRIPTION OF THE PREFERRED EMBODIMENT

Further details and advantages of the subject matter of the invention will become apparent from the following detailed description of the drawing.

A scale member 1 consisting, e.g., of glass and a scanning unit 2, which is movable along the scale member, are accommodated in a tubular enclosure, which is not shown and is formed with a slot, which is sealed by means of sealing lips, between which a sword-like actuator for moving the scanning unit extends. The actuator may be connected, e.g., to a tool carriage of a machine tool which is provided with the measuring system.

A scale 3, which is adapted to be scanned by optoelectronic methods, is provided on the scale member 1. In the scanning unit 2, four scale-scanning sets may be associated with that scale 3 and may consist each of a scanning grating and a photoelectric receiver. The scanning gratings are offset from each other by fractional parts of an increment of the scale and pairs of the associated receivers are arranged in respective antiparallel connections so that the scanning of the scale will result in an appearance of basically sinusoidal analog measured-value signals, which are displaced 90° in phase, at two terminals 4, 5. Said signals are delivered via lines 6, 7 to a direction detector 8 and to an evaluating stage 9. Separate illuminating means (e.g., light-emitting diodes) may be associated with each of the above-mentioned photoelectric receivers and with an additional photoelectric receiver 10, which will be described hereinafter, or a common illuminating device may be provided, which through an optical system illuminates the scale 3 and an additional track, which is provided on the scale member 1 and associated with the receiver 10. The scale member 1 may be scanned with incident light, transmitted light or, if the scale member is metallized on its rear surface, with reflected light.

The evaluating unit 9 receives the measured-value signals and receives from the direction detector 8 a signal which indicates the direction of movement of the scanning unit 2. The evaluating unit may comprise multiplier circuits, consisting, e.g., of potentiometer circuits, for electronically subdividing the scale increments or multiplier circuits for indicating a phase displacement may be used and in that case the illuminating device may be pulsed. In a preferred arrangement, counting circuits are provided for counting digital countable signals derived from the measured-value signals and a computer is used for an arithmetic interpolation. Particularly if a computer is employed, free-running counters which are periodically sampled by the computer may be provided for the two counting senses "up" and "down" for movements to the right and left, respectively, In that case the zero location for the control or indicating function can be defined by a reference point in that the count obtained at the zero location is stored and the current position of the scanning unit relative to the thus defined zero locations is computed from the current count and the stored distances mentioned above. The result of the measurement is displayed by a display unit and/or is used for a control of a machine or robot.

The circuit which has been described hereinbefore is known in the art. In accordance with the invention the means for generating one or each required reference pulse comprise a carrier plate 11, which is releasably secured to the scale member 1 and may consist, e.g., of a spring clip and carries first and second reference marks 12, 13, which are spaced along the scale 3 and can be scanned by means of the receiver 10 and interposed gratings. (The reference pulse may but need not be utilized whenever the scale member is canned at the corresponding location and in most cases is generated only after a separate switch has been actuated, particularly for effecting a calibration at the beginning of a measurement or at the beginning of a working day.) The carrier plate 11 may be secured to the scale member by separate resilient retaining means, between which the carrier plate 11 can forcibly be inserted, or may adhesively be bonded to the scale member. Upon the scanning of each of the two reference marks 12, 13 by the scanning unit 2, the photoelectric receiver 10 generates a reference mark signal, which has a characteristic portion, e.g., a pulse edge, which can exactly be detected. Said signals are delivered via a line 14 to a control circuit 15, which is shown as a separate unit but just as the direction detector 8 and the memory 16, which will be described in connection with the control circuit 15, may be incorporated in the evaluating unit 9. The control circuit 15 is connected to the evaluating unit 9 or is incorporated therein and receives direction signals indicating the direction of movement from the direction detector 8 and receives countable signals from the unit 9.

A reference point R disposed between the reference marks 12, 13 is in register with a predetermined increment of the scale 3 and is spaced first and second distances from the first and second reference marks 12, 13, respectively.

The distance between the reference marks 12 and 13 is designated Z. The first distance of the reference point R from the left-hand or first reference mark 12 is designated $Z_1$ and the second distance of the reference point R from the right-hand or second reference mark 13 is designated $Z_2$. For the generation of the reference pulse the control circuit 15 will be enabled in response to the scanning of the reference mark 12 in the direction from left to right so that the evaluating circuit 15 will then receive from the evaluating unit countable pulses and will count said pulses in the proper sense, which is determined by the direction signal from the direction detector 8. Data corresponding to the distances $Z_1$ and $Z_2$ have been stored in the memory 16.

The memory 16 for storing the distances $Z_1$ and $Z_2$ may consist of counting circuits, which in response to the reference mark signals indicating the scanning of the reference mark 12 or 13 are set to the value $Z_1$ or $Z_2$ with a sign which is determined by the direction signal from the direction detector 8 and are subsequently caused to count in response to additional countable pulses. Because the countable pulses which are used are derived from the measured-value signals generated in response to the scanning of the scale 3, said pulses occur with the proper edge or phase coincidence with the analog measured-value signal or the digital countable signal. As soon as the count has reached the stored value $Z_1$ (when the count has been initiated by the scanning of the reference mark 12) or the stored value $Z_2$ (when the count has been initiated by the scanning of the reference mark 13), the evaluating stage 15 delivers a reference pulse via a line 17.

Alternatively, said counting circuits may consist of first and second downcounters, which are preset to the first and second distances $Z_1$ and $Z_2$, respectively and one of which as well as one of the reference marks 12 or 13 is selected in dependence on the direction signal from the direction detector 8 and in response to the reference mark signal indicating the scanning of the selected reference mark 12 or 13 counts the countable pulses and the pulse shaper stage generates the reference pulse when the zero count has been reached. The reference pulse will be generated when the carrier plate 11 is scanned at the reference point R, which registers with an exactly defined increment of the scale 3. The signals generated in response to the scanning of the reference marks 12, 13 may be evaluated to serve only to enable the evaluating stage 15, which when it has been enabled to controlled by the countable signals so that the distances $Z_1$ and $Z_2$ will then be defined by an integral number of counting increments.

In the above-described location of the reference point R relative to the reference marks 12 and 13

$$Z = Z_1 + Z_2 \text{ and}$$

$$Z_1 \pm n = Z_2,$$

wherein n may be zero or an integer. In most cases n will be as small as possible or equal to zero. The distance Z may be very small if this is desired. The distance Z is necessary for permitting an exact definition of the reference point and in order to ensure that the scanning set 10 will generate separate signals in response to the scanning of the reference marks 12 and 13. It has been set forth in the general part of this description that the direction of the scanning movement may be taken into account in that the two reference marks have different configurations or in that the reference mark scanning set is adapted to generate a base signal on a first level when it is scanning said carrier plate 11 between the reference marks 12 and 13 and on a second level when it is scanning the scale member outside said carrier plate and the evaluating circuit will be enabled for the generation of a reference pulse only when the scanning of one of said reference marks is succeeded by the generation of said base signal on said first level.

We claim:
1. In an incremental measuring system comprising.
  a scale member provided with a scale consisting of a sequence of scale increments and further provided with a plurality of reference marks spaced apart along said scale,
  a scanning unit mounted to perform relative to said scale member a non-contacting scanning movement in opposite directions along said scale and comprising a plurality of scale-scanning sets for scanning said scale and for producing analog measured-value signals in response to the scanning of said scale, and a reference mark scanning set for scanning said reference marks and for producing a reference mark signal in response to the scanning of said reference marks, and
  evaluating means for receiving said measured-value signals and for deriving from said measured-value signals digital countable signals and a direction signal indicating the direction of said scanning movement, said evaluating means comprising counting means for counting said countable signals in a sense depending on said direction signal and for generating a count indicating the position of said reference mark scanning relative to said scale,
  and an evaluating circuit for receiving said reference mark signal and for generating a reference pulse when said counting means indicate that said scale member is being scanned by said reference mark scanning set at a reference point, which registers with a predetermined one of said scale increments and is spaced along said scale from each of said reference marks,
the improvement comprising
  at least one reference mark carrier releasably secured to said scale member,
  said reference marks comprising at least one pair of first and second reference marks on said carrier and spaced along said scale,
  selecting means for defining for said reference point on said carrier a location which is disposed between said first and second reference marks and is spaced first and second distances from said first and second reference marks, respectively, which selecting means comprise memory means for storing said first and second distances, and wherein
  said evaluating circuit comprises a pulse shaper stage for generating said reference pulse and a control circuit for indicating in dependence on said direction signal and on said reference mark signal that said reference mark scanning set is scanning one of said first and second reference marks by a scanning movement toward the other of said first and second reference marks, and for causing said pulse shaper stage to generate said reference pulse when said counting means indicate that said reference mark scanning set has moved from said one reference mark toward the other over said one of said stored distances.

2. The improvement set forth in claim 1, wherein said control circuit is arranged to cause said pulse shaper stage to generate said reference pulse in phase and edge coincidence with that analog measured-value signal which is generated by said scale-scanning sets in response to the scanning of the scale increment which registers with said reference point and in phase and edge coincidence with the countable signal which has been derived from said analog measured-value signal.

3. The improvement set forth in claim 1, wherein said pulse shaper stage comprises a memory for controlling the shape of said reference pulse.

4. The improvement set forth in claim 1, wherein
  said carrier is mounted on said scale member to be movable along said scale and
  fixing means are provided for releasably fixing said carrier in position on said scale member.

5. The improvement set forth in claim 1, wherein
  said counting means comprise first and second downcounters, which are adapted to be preset to respective first and second counts respectively corresponding to said first and second distances stored in said memory means and
  said control circuit is arranged to select one of said downcounters and one of said reference marks in dependence on said direction signal and, in response to the reference mark signal indicating the scanning of the selected reference mark, to cause said selected downcounter to count said countable signals, and to cause said pulse shaper stage to generate said reference pulse when said selected downcounter has counted down to zero.

* * * * *